US010218254B1

(12) United States Patent
Neyra et al.

(10) Patent No.: US 10,218,254 B1
(45) Date of Patent: Feb. 26, 2019

(54) SWITCHING POWER SUPPLY AND METHOD FOR OPERATING A SWITCHED-MODE POWER SUPPLY

(71) Applicant: NXP USA, Inc., Austin, TX (US)

(72) Inventors: Percy Edgard Neyra, Chandler, AZ (US); John Pigott, Phoenix, AZ (US); John Ryan Goodfellow, Mesa, AZ (US); Kyle James Wollschlager, Chandler, AZ (US); Ondrej Pauk, Chandler, AZ (US); Raviraj Dattatraya Vader, Chandler, AZ (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 15/840,434

(22) Filed: Dec. 13, 2017

(51) Int. Cl.
*H02M 3/158* (2006.01)
*H02M 3/156* (2006.01)
*H02M 1/08* (2006.01)
*H02M 1/00* (2006.01)

(52) U.S. Cl.
CPC .......... *H02M 1/08* (2013.01); *H02M 3/158* (2013.01); *H02M 2001/0041* (2013.01)

(58) Field of Classification Search
CPC .... H02M 3/158; H02M 3/156; H02M 3/1563; H02M 1/08
See application file for complete search history.

(56) References Cited

U.S. PATENT DOCUMENTS

| 6,229,289 | B1 | 5/2001 | Piovaccari et al. | |
|---|---|---|---|---|
| 7,230,408 | B1 * | 6/2007 | Vinn | H02M 3/156 323/273 |
| 8,552,706 | B2 * | 10/2013 | Wu | H02M 3/156 323/284 |
| 8,593,123 | B2 * | 11/2013 | Chen | H02M 3/1563 323/282 |
| 8,614,567 | B2 * | 12/2013 | Wu | H02M 3/1588 323/271 |
| 9,318,288 | B2 * | 4/2016 | Chen | H02M 3/00 |

(Continued)

OTHER PUBLICATIONS

Texas Instruments, "2-MHz 600-mA Step-Down DC-DC Converter With Mode Control" m LM3676, SNVS426C, Nov. 2006—Revised May 2013, 25 pages.

*Primary Examiner* — Timothy J Dole
*Assistant Examiner* — Sisay G Tiku
(74) *Attorney, Agent, or Firm* — Charlene R. Jacobsen

(57) ABSTRACT

Embodiments of a switched-mode power supply and a method for operating a switched-mode power supply involve synchronizing a phase and frequency of an asynchronous controller of the switched-mode power supply with a clock signal of a synchronous controller of the switched-mode power supply while the asynchronous controller is in control of a power stage of the switched-mode power supply, concurrent with synchronizing the phase and frequency of the asynchronous controller with the clock signal of the synchronous controller, presetting a state variable of the synchronous controller while the asynchronous controller is in control of the power stage of the switched-mode power supply, and switching control of the power stage from the asynchronous controller to the synchronous controller after the phase and frequency of the asynchronous controller are synchronized with the clock signal of the synchronous controller and after the state variable of the synchronous controller is preset.

17 Claims, 11 Drawing Sheets

(56) References Cited

U.S. PATENT DOCUMENTS

| | | | |
|---|---|---|---|
| 9,471,077 B2 | 10/2016 | Kobayashi | |
| 2005/0057238 A1* | 3/2005 | Yoshida | H02M 3/156 323/282 |
| 2007/0257647 A1* | 11/2007 | Chen | H02M 3/157 323/282 |
| 2008/0022139 A1* | 1/2008 | Lin | H02M 3/1588 713/320 |
| 2009/0174379 A1* | 7/2009 | Lima | H02M 3/1588 323/282 |
| 2009/0218999 A1* | 9/2009 | Kikuchi | H02M 3/156 323/282 |
| 2009/0323457 A1* | 12/2009 | Shori | G11C 7/1006 365/233.1 |
| 2011/0006744 A1 | 1/2011 | Dearborn | |
| 2011/0156684 A1* | 6/2011 | da Silva | H02M 3/156 323/284 |
| 2013/0083869 A1* | 4/2013 | de Ruijter | H04L 27/22 375/324 |

\* cited by examiner

SWITCHING POWER SUPPLY AND METHOD FOR OPERATING A SWITCHED-MODE POWER SUPPLY

BACKGROUND

Embodiments of the invention relate generally to electrical systems and methods and, more particularly, to power supply circuits and methods for operating power supply circuits.

A power supply circuit generates a desired power (e.g., an output voltage) based on an input power (e.g., an input voltage). For example, a switched-mode power supply converts an input voltage and/or current to a desired output voltage and/or current using a switching power stage. It is desirable to have a switched-mode power supply that converts power efficiently. One or more controller Integrated Circuits (ICs) can be used to control the functions or elements of a switched-mode power supply. For example, a synchronous controller can be used to control the functions of a switched-mode power supply synchronized with a clock signal, while an asynchronous controller can be used to control the functions of a switched-mode power supply without being synchronized to a clock signal. However, switching between asynchronous control and synchronous control may cause disruption of the operation of a switched-mode power supply, for instance, by allowing the output voltage level to deviate from a desired value.

SUMMARY

Embodiments of a switched-mode power supply and a method for operating a switched-mode power supply are disclosed. In an embodiment, a method for operating a switched-mode power supply involves synchronizing a phase and frequency of an asynchronous controller of the switched-mode power supply with a clock signal of a synchronous controller of the switched-mode power supply while the asynchronous controller is in control of a power stage of the switched-mode power supply, concurrent with synchronizing the phase and frequency of the asynchronous controller with the clock signal of the synchronous controller, presetting a state variable of the synchronous controller while the asynchronous controller is in control of the power stage of the switched-mode power supply, and transferring control of the power stage from the asynchronous controller to the synchronous controller after the phase and frequency of the asynchronous controller are synchronized with the clock signal of the synchronous controller and after the state variable of the synchronous controller is preset. Other embodiments are also described.

In an embodiment, synchronizing the phase and frequency of the asynchronous controller of the switched-mode power supply with the clock signal of the synchronous controller of the switched-mode power supply involves synchronizing the phase and frequency of the asynchronous controller of the switched-mode power supply with a phase and frequency of the clock signal of the synchronous controller while the asynchronous controller is in control of the power stage of the switched-mode power supply.

In an embodiment, the method further involves concurrent with synchronizing the phase and frequency of the asynchronous controller with the clock signal of the synchronous controller, controlling a multiplexer to connect an output of the asynchronous controller to the power stage.

In an embodiment, presetting the state variable of the synchronous controller involves presetting the state variable of the synchronous controller in response to an external signal.

In an embodiment, presetting the state variable of the synchronous controller involves setting an output of a compensation unit in the synchronous controller to a preset status.

In an embodiment, transferring control of the power stage from the asynchronous controller to the synchronous controller involves controlling a multiplexer to connect an output of the synchronous controller to the power stage.

In an embodiment, presetting the state variable of the synchronous controller involves presetting the state variable of the synchronous controller in response to a change in a load of the switched-mode power supply or a change in an input voltage provided to the switched-mode power supply.

In an embodiment, a controller device for operating a switched-mode power supply includes an asynchronous controller, a synchronous controller, and a control unit configured to synchronize a phase and frequency of the asynchronous controller of the switched-mode power supply with a clock signal of the synchronous controller of the switched-mode power supply while the asynchronous controller is in control of a power stage of the switched-mode power supply, concurrent with synchronizing the phase and frequency of the asynchronous controller with the clock signal of the synchronous controller, preset a state variable of the synchronous controller while the asynchronous controller is in control of the power stage of the switched-mode power supply, and transfer control of the power stage from the asynchronous controller to the synchronous controller after the phase and frequency of the asynchronous controller are synchronized with the clock signal of the synchronous controller and after the state variable of the synchronous controller is preset.

In an embodiment, the synchronous controller is configured to control the power stage based on the clock signal, and the asynchronous controller is configured to control the power stage without being synchronized to a clock signal.

In an embodiment, the control unit is further configured to concurrent with synchronizing the phase and frequency of the asynchronous controller with the clock signal of the synchronous controller, preset the state variable of the synchronous controller in response to a change in a load of the switched-mode power supply or a change in an input voltage into the switched-mode power supply while the asynchronous controller is in control of the power stage of the switched-mode power supply.

In an embodiment, the control unit includes a sample and hold unit configured to, concurrent with synchronizing the phase and frequency of the asynchronous controller with the clock signal of the synchronous controller, set an output of a compensation unit in the synchronous controller to a preset status.

In an embodiment, the control unit further includes a control logic circuit configured to make a determination that the phase and frequency of the asynchronous controller are synchronized with the clock signal of the synchronous controller.

In an embodiment, the control unit includes a phase lock controller configured to synchronize the phase and frequency of the asynchronous controller of the switched-mode power supply with the clock signal of the synchronous controller in response to a change in a load of the switched-mode power supply, a change in an input voltage provided to the switched-mode power supply, or an external signal while the asynchronous controller is in control of the power stage of the switched-mode power supply.

In an embodiment, the control unit includes a multiplexer configured to connect an output of the synchronous controller to the power stage after the phase and frequency of the asynchronous controller are synchronized with the clock signal of the synchronous controller and after the state variable of the synchronous controller is preset.

In an embodiment, the control unit includes a frequency controller configured to synchronize the phase and frequency of the asynchronous controller of the switched-mode power supply with a phase and frequency of the clock signal of the synchronous controller while the asynchronous controller is in control of the power stage of the switched-mode power supply.

In an embodiment, a switched-mode power supply includes a power stage, an asynchronous controller configured to control the power stage without being synchronized to a clock signal, a synchronous controller configured to control the power stage based on a clock signal, and a control unit configured to synchronize a phase and frequency of the asynchronous controller of the switched-mode power supply with a clock signal of the synchronous controller of the switched-mode power supply while the asynchronous controller is in control of a power stage of the switched-mode power supply, concurrent with synchronizing the phase and frequency of the asynchronous controller with the clock signal of the synchronous controller, preset a state variable of the synchronous controller while the asynchronous controller is in control of the power stage of the switched-mode power supply, and transfer control of the power stage from the asynchronous controller to the synchronous controller after the phase and frequency of the asynchronous controller are synchronized with the clock signal of the synchronous controller and after the state variable of the synchronous controller is preset.

In an embodiment, the control unit includes a sample and hold unit configured to set an output of a compensation unit in the synchronous controller to a preset status before control of the power stage is switched to the synchronous controller.

In an embodiment, the control unit further includes a control logic circuit configured to make a determination that the phase and frequency of the asynchronous controller are synchronized with the clock signal of the synchronous controller.

In an embodiment, the control unit includes a phase lock controller configured to synchronize the phase and frequency of the asynchronous controller of the switched-mode power supply with the clock signal of the synchronous controller in response to a change in a load of the switched-mode power supply, a change in an input voltage provided to the switched-mode power supply, or an external signal while the asynchronous controller is in control of the power stage of the switched-mode power supply.

In an embodiment, the control unit further includes a multiplexer configured to connect an output of the synchronous controller to the power stage after the phase and frequency of the asynchronous controller are synchronized with the clock signal of the synchronous controller and after the state variable of the synchronous controller is preset.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
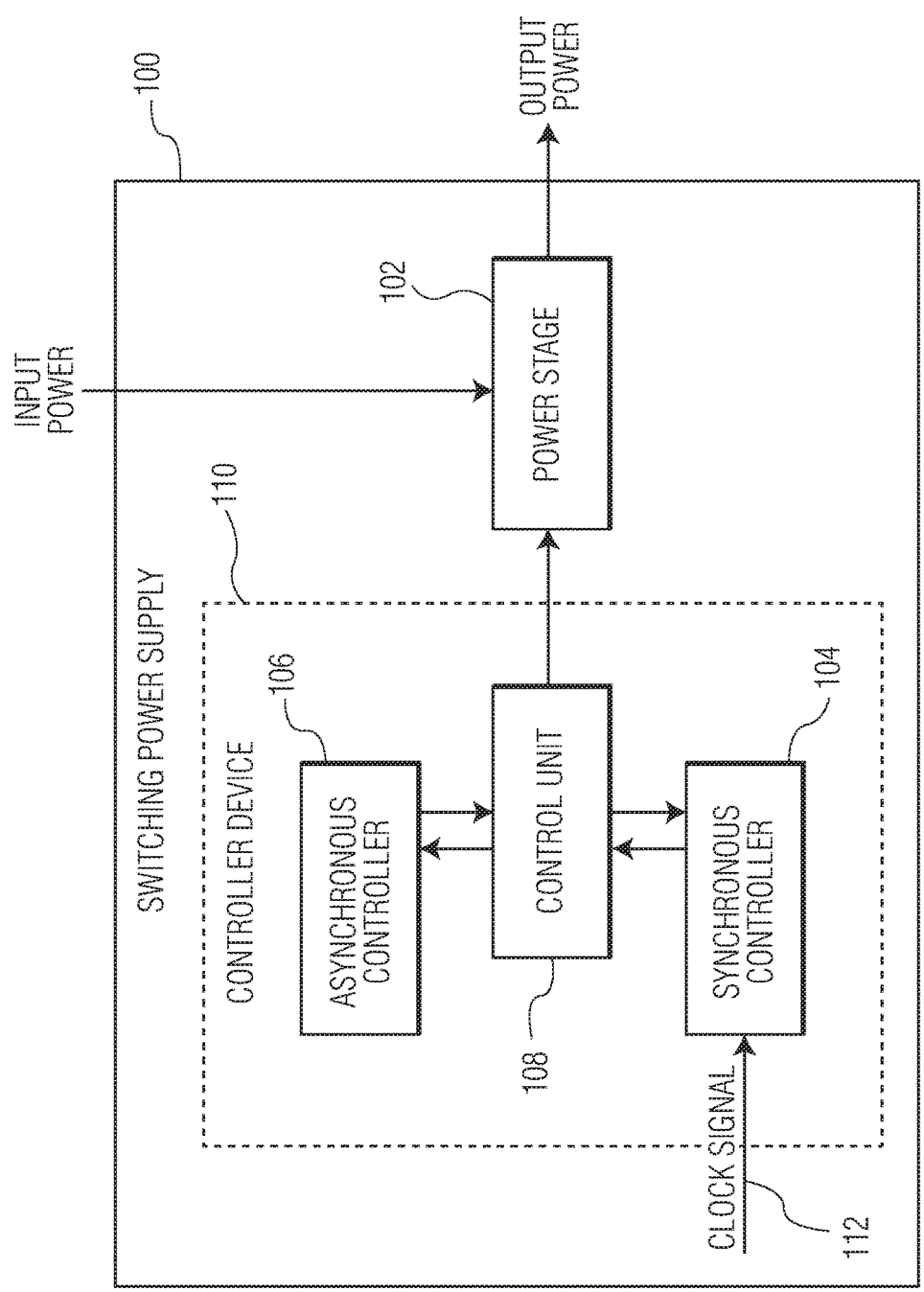
FIG. 1 is a schematic block diagram of a switched-mode power supply in accordance with an embodiment of the invention.

FIG. 1 is a schematic block diagram of a switched-mode power supply 100 in accordance with an embodiment of the invention. The switched-mode power supply converts an input power to a desired output power (e.g., converts an input voltage level to a stable output voltage level for load currents within an acceptable range). The switched-mode power supply can be used in various applications, such as automotive applications, communications applications, industrial applications, medical applications, computer applications, and/or consumer or appliance applications. In the embodiment depicted in FIG. 1, the switched-mode power supply includes a power stage 102, a synchronous controller 104, an asynchronous controller 106, and a control unit 108. In some embodiments, the switched-mode power supply is included in a computing device, such as a smartphone, a tablet computer, a laptop, etc. In some embodiments, the control unit is implemented in a substrate, such as a semiconductor wafer or a printed circuit board (PCB). In an embodiment, the control unit is packaged as a stand-alone semiconductor IC chip. In some embodiments, the synchronous controller, the asynchronous controller, and the control unit are formed in a controller device 110, which can be implemented in a single substrate, such as a semiconductor wafer, or integrated together onto a PCB. In an embodiment, the controller device is packaged as a semiconductor IC chip. Although the switched-mode power supply is shown in FIG. 1 as including certain circuit elements, in other embodiments, the switched-mode power supply may include one or more additional circuit elements.

The power stage 102 is configured to deliver an output power in response to the input power received at the switched-mode power supply 100. For example, the power stage delivers power available at an input of the switched-mode power supply to a load in a controlled and efficient manner. In some embodiments, the input power received at the switched-mode power supply is Alternating Current (AC) power and the output power is an output voltage, such as a Direct Current (DC) voltage. The power stage may include a switching regulator such as a resonant converter, a flyback converter or other types of switching regulators that are well known in the art. In some embodiments, the power stage includes at least one transistor, an inductor, a transformer, and/or a diode.

The synchronous controller 104 is configured to control the functions of the switched-mode power supply 100 based on a clock signal 112. The asynchronous controller 106 is configured to control the functions of the switched-mode power supply 100 without requiring synchronization to a clock signal. The synchronous controller and/or the asynchronous controller may be implemented in suitable logical and/or analog circuits. In some embodiments, the synchronous controller and/or the asynchronous controller are implemented using a processor such as a microcontroller or a central processing unit (CPU). Each of the synchronous controller and the asynchronous controller may have advantages or disadvantages depending on the level of the load to which the power stage delivers power and the needs of the system in which the switched-mode power supply operates within. For example, a synchronous controller operates at a fixed switching frequency, which produces a set of predictable switching frequency harmonics. In addition, the synchronous controller can offer predictable output impedance at its output and a more predictable transient response given its more predictable compensation for stability. In contrast with a synchronous controller, an asynchronous controller operates at a variable switching frequency because the operation of the asynchronous controller is not bound to a clock signal. The variation of the switching frequency of the asynchronous controller can produce a wide range of switching noise and harmonics. On the other hand, because the operation of the asynchronous controller is not bound to a clock signal, the asynchronous controller may have a faster response to transient disturbances on the load of the switched-mode power supply. Compared to a synchronous controller, an asynchronous controller typically has better power efficiency at lighter loads because the asynchronous controller can decrease the operating frequency as the load drops, thereby reducing the switching losses and providing power to the load as needed. In addition, compared to an asynchronous controller, a synchronous controller typically has better power efficiency at higher loads. In particular, an asynchronous controller operates at high frequency at high loads, which causes the power efficiency of the asynchronous controller to be lower than the power efficiency of a synchronous controller, which operates at a fixed frequency. By having both a synchronous controller and an asynchronous controller, the switched-mode power supply, in particular, the power stage 102 can be controlled based on the power requirements of the load to which the power stage delivers power and a system in which the switched-mode power supply operates within.

In the embodiment depicted in FIG. 1, the control unit 108 is configured to transfer control of the switched-mode power supply 100 between the synchronous controller 104 and the asynchronous controller 106. The transfer from asynchronous control to synchronous control can be triggered by an event such as a change in the load of the switched-mode power supply, a change in the input voltage provided to the switched-mode power supply or an external signal, which makes synchronous control the preferred mode of operation. The control unit may be implemented in suitable logical and/or analog circuits. For example, the control unit is implemented as a processor such as a microcontroller or a CPU. In one instance, when a greater load is connected to the switched-mode power supply, the control unit transfers control of the switched-mode power supply from the asynchronous controller to the synchronous controller for predictability, ease of stability and high efficiency of the synchronous controller. In another instance, when a lighter load is connected to the switched-mode power supply, the control unit transfers control of the switched-mode power supply from the synchronous controller to the asynchronous controller for better power efficiency.

Switching control of the switched-mode power supply 100 between the asynchronous controller 106 and the synchronous controller 104 can cause deviations in the output voltage of the switched-mode power supply, which in turn may cause unintended resets and/or may damage electronic components. For example, the clock signal 112 that drives the synchronous controller may be out-of-phase and uncorrelated with the free-running switching frequency of the asynchronous controller, which may cause unintended resets and/or may damage electronic components. When load or other conditions are such that synchronous control is preferred, the control unit 108 can switch control of the switched-mode power supply from the asynchronous controller to the synchronous controller without causing a large fluctuation of the output power (e.g., the output voltage) of the switched-mode power supply, as described below. In the embodiment depicted in FIG. 1, the control unit is configured to synchronize a phase and frequency of the asynchronous controller of the switched-mode power supply with a clock signal of the synchronous controller of the switched-mode power supply while the asynchronous controller is in control of a power stage of the switched-mode power supply, concurrent with synchronizing the phase and frequency of the asynchronous controller with the clock signal of the synchronous controller, preset a state variable of the synchronous controller while the asynchronous controller is in control of the power stage of the switched-mode power supply, and transfer control of the power stage from the asynchronous controller to the synchronous controller after the phase and frequency of the asynchronous controller are synchronized with the clock signal of the synchronous controller and after the state variable of the synchronous controller is preset. In some embodiments, the state variable of the synchronous controller is a voltage at the synchronous controller (e.g., an output voltage at a compensation unit of the synchronous controller). Presetting the state variable of the synchronous controller can set the duty cycle of the synchronous controller to an expected value or a predetermined value or can set the current in the power stage to an expected value or a predetermined value. During the time that the phase and frequency of the asynchronous controller become synchronous with the clock signal that drives the synchronous controller, the state variable of the synchronous controller is preset to a value that is close to the operating value in the synchronous mode. When the transfer to synchronous control occurs, the synchronous controller takes over seamlessly because its state variable(s) are preset, and the clocking of the power stage at the end of asynchronous control is the same as the clocking of the power stage at the start of synchronous control. Consequently, the output power (e.g., the output voltage) of the switched-mode power supply can be maintained at a certain value or within a threshold of a certain value. For example, at the transfer of control of the power stage from the asynchronous controller to the synchronous controller, outputs from the synchronous controller to the power stage can be maintained within a predetermined range before transfer of control and after transfer of control. In addition, the behavior (e.g., the phase and frequency) of the asynchronous controller can be smoothly adjusted to the behavior (e.g., the phase and frequency of the clock signal 112) of the synchronous controller while a state variable of the synchronous controller is preset. Consequently, the deviation of the output power of the switched-mode power supply can be reduced and the possibility of unintended resets and/or overvoltage that can damage sensitive electronic components can be lowered.

Figure 2:
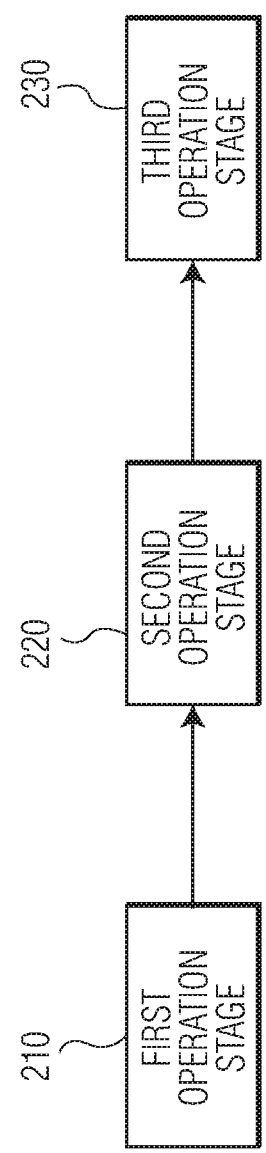
FIG. 2 depicts three operation stages of the switched-mode power supply depicted in FIG. 1.

FIG. 2 depicts three operation stages 210, 220, 230 of the switched-mode power supply 100 depicted in FIG. 1. In the first operation stage 210, the asynchronous controller 106 controls the power stage. In the second operation stage 220, which is a transition stage, the asynchronous controller still controls the power stage while the frequency and phase of the asynchronous controller is adjusted to align with the frequency and phase of the synchronous controller 104. Simultaneously, a state variable of the synchronous controller is preset. The switched-mode power supply may enter the second operation stage automatically or in response to an external command. In some instances, if the phase and frequency of the asynchronous controller cannot be synchronized with the phase and frequency of the synchronous controller, a timeout may force control of the power stage to be transferred from the asynchronous controller to the synchronous controller. In the third operation stage 230, the synchronous controller controls the power stage.

Figure 3:
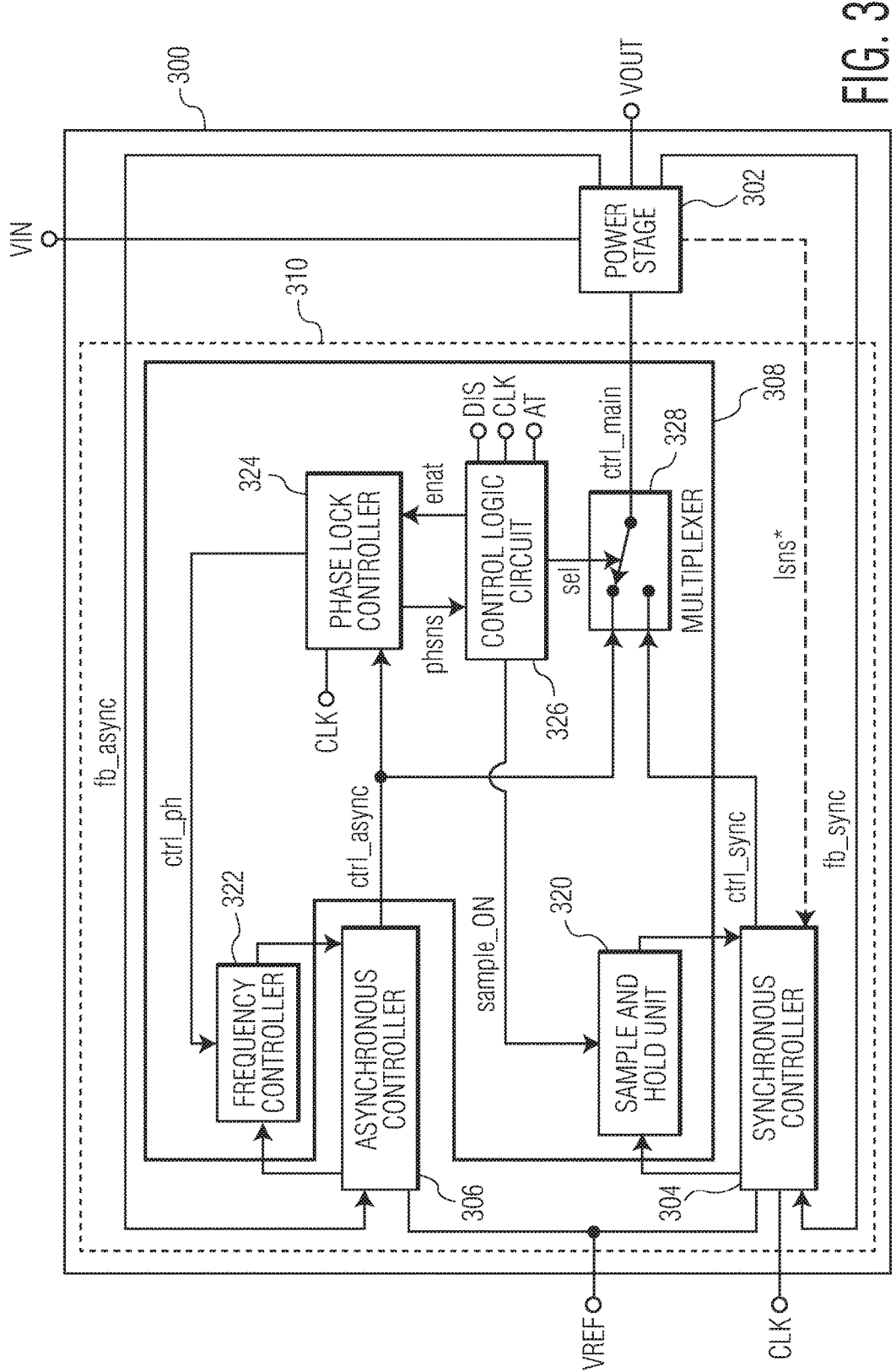
FIG. 3 depicts an embodiment of the switched-mode power supply depicted in FIG. 1.

FIG. 3 depicts an embodiment of the switched-mode power supply 100 depicted in FIG. 1. In the embodiment of FIG. 3, a switched-mode power supply 300 includes a power stage 302, a synchronous controller 304, an asynchronous controller 306, and a control unit 308. The switched-mode power supply 300 depicted in FIG. 3 is a possible implementation of the switched-mode power supply 100 in FIG. 1. The power stage 302, the synchronous controller 304, the asynchronous controller 306, and the control unit 308 depicted in FIG. 3 are embodiments of the power stage 102, the synchronous controller 104, the asynchronous controller 106, and the control unit 108 depicted in FIG. 1, respectively. However, the switched-mode power supply depicted in FIG. 1 can be implemented differently from the switched-mode power supply depicted in FIG. 3.

In the embodiment of FIG. 3, the synchronous controller 304 is configured to control the functions of the switched-mode power supply 300 based on a clock signal, "CLK." The asynchronous controller 306 is configured to control the functions of the switched-mode power supply without being synchronized to a clock signal. The control unit 308 can switch control of the switched-mode power supply from the asynchronous controller to the synchronous controller without causing a large fluctuation of the output voltage, "VOUT," of the switched-mode power supply. In the embodiment depicted in FIG. 3, the control unit 308 includes a sample and hold unit 320, a frequency controller 322, a phase lock controller 324, a control logic circuit 326, and a multiplexer 328. The sample and hold unit is configured to preset a state variable of the synchronous controller based on the captured state. In some embodiments, the sample and hold unit is configured to preset state values of the synchronous controller while the phase and frequency of the asynchronous controller is being synchronized with the clock signal, CLK, which is used to drive the synchronous controller. Examples of the state values of the synchronous controller include, without being limited to, a composite signal of the sum of the output of a sensor monitoring the current in the power stage's inductor and an artificial ramp signal, which is independent or dependent on the input and or output voltage(s) of the power stage, an artificial ramp signal, which is independent or dependent on the input and or output voltage(s) of the power stage, and a half-way rectified signal proportional to the mains input to the power stage. For example, the sample and hold unit is further configured to set a state variable in the synchronous controller to a preset value before control of the power stage is transferred to the synchronous controller. The frequency controller is configured to control the phase and frequency of the asynchronous controller. The phase lock controller is configured to monitor the operation of the asynchronous controller and to control the frequency controller. In some embodiments, the phase lock controller is configured to synchronize the phase and frequency of the asynchronous controller with the phase and frequency of the clock signal, CLK, of the synchronous controller in response to an external signal. The control logic circuit is configured to control the sample and hold unit, the multiplexer, and the phase lock controller. In some embodiments, the control logic circuit is configured to make a determination that the phase and frequency of the asynchronous controller are synchronized with the phase and frequency of the clock signal, CLK, for driving the synchronous controller and to trigger the transfer of control from the asynchronous controller to the synchronous controller (e.g., to control the multiplexer) in response to the determination. The multiplexer is configured to connect the output of the synchronous controller or the output of the asynchronous controller to the power stage in response to a control signal from the control logic circuit.

An example operation of the control unit 308 depicted in FIG. 3 is described as follows. At a given time, the input signal, "ctrl_main," of the power stage 302 can be controlled by the asynchronous controller 306 or by the synchronous controller 304 depending on the configuration of the multiplexer 328. The output of the power stage 302 may be controlled via the pulse width of the output signal, ctrl_sync, of the synchronous controller 204. When a disable signal, "DIS," is asserted at the control logic circuit 326 and a control signal, "sel," for selecting an operational mode for the multiplexer for connecting either the output of the synchronous controller or the output of the asynchronous controller to the power stage, is not-asserted at the multiplexer, the multiplexer provides control of the power stage from the asynchronous controller, for example, by connecting the output of the asynchronous controller to the input of the power stage. Subsequently, the asynchronous controller controls the output signal, VOUT, of the power stage in an asynchronous manner and without being bound to the clock signal, CLK. For example, the power stage switches at a frequency uncorrelated to the clock signal, CLK, and the clock signal, CLK, can remain un-asserted or turned off. When the disable signal, DIS, is un-asserted at the control logic circuit, the clock signal, CLK, provides at a fixed frequency before the control assertion signal, "AT," can be registered as asserted at a rising edge of the clock signal, CLK. Once the signal, AT, is registered, an enable signal, "enat," is asserted at the phase lock controller 324, indicating that the transition of control of the power stage from the asynchronous controller to the synchronous controller can begin. When the clock signal, CLK, provides a fixed frequency and the signal, AT, is asserted, the phase lock controller monitors the uncorrelated frequency of a control signal, "ctrl_async," of the asynchronous controller and produces a control signal, "ctrl_ph," for the frequency controller to modify the phase and/or frequency feedback through the frequency controller. The asynchronous controller controls the switching frequency of the power stage based on the input from the frequency controller. The frequency controller and the phase lock controller execute the phase/frequency modification while the asynchronous controller remains in control of the output voltage, VOUT, of the power stage, which can prevent large excursions on the output voltage, VOUT. Concurrent to the phase/frequency modification at the asynchronous controller, the synchronous controller is allowed to use the clock signal, CLK, to pre-bias its internal nodes to maintain a state without being handed control of the power stage. When the phase lock controller synchronizes the phase/frequency, the phase lock controller also provides a signal, "phsns," to the control logic circuit, which determines whether or not synchronization of phase/frequency has been achieved. For example, the control logic circuit waits for a stream of pulses or no pulses of the signal, phsns, and a predetermined number of N cycles of the clock signal, CLK, before determining that phase/frequency synchronization has been achieved. Concurrent to phase/frequency synchronization, the control logic circuit asserts a control signal, "sample_ON," at the sample and hold unit 320, which presets the state variable(s) of the synchronous controller. When phase/frequency synchronization is achieved, the control logic circuit asserts the signal, sel, at the multiplexer on the next available rising edge of the clock signal, CLK. The assertion of the signal, sel, at the multiplexer completes the transition of control of the power stage from the asynchronous controller to the synchronous controller by, for example, connecting the output of the synchronous controller to the input of the power stage, which allows the synchronous controller to drive the power stage through the control signal, "ctrl_sync."

Figure 4:
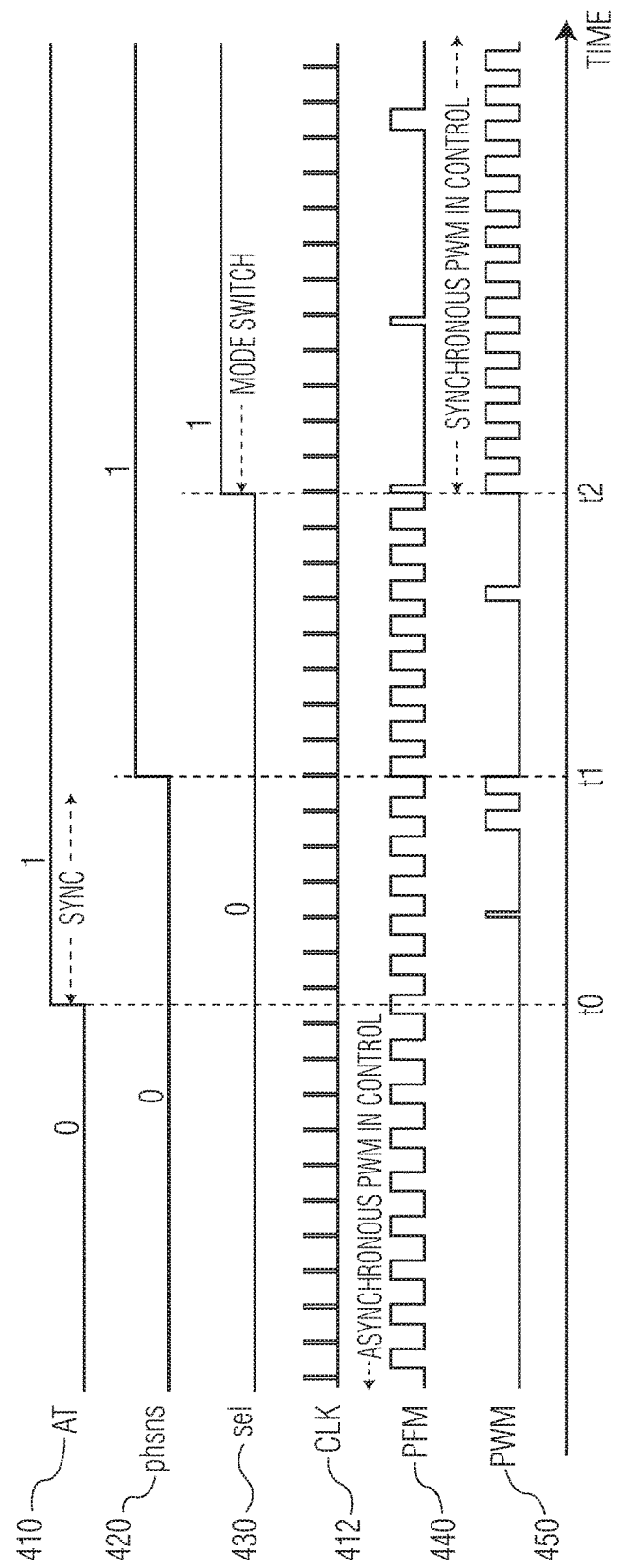
FIG. 4 is a signal timing diagram corresponding to the switched-mode power supply depicted in FIG. 3.

FIG. 4 is a signal timing diagram corresponding to the switched-mode power supply 300 depicted in FIG. 3. In the signal timing diagram illustrated in FIG. 4, control of the power stage 302 is transitioned from the asynchronous controller 306, which can implement pulse frequency modulation (PFM), to the synchronous controller 304, which can implement pulse width modulation (PWM). The signals illustrated in FIG. 4 include the control signal, AT, 410, for the control logic circuit 326, the control signal, phsns, 420, for the control logic circuit, the control signal, sel, 430, for the multiplexer 328, the clock signal, CLK, 412, an output PFM signal 440 from the asynchronous controller, and an output PWM signal 450 from the synchronous controller. At time point, t0, the control signal, AT, changes from logic 0 to logic 1, and the synchronization between the asynchronous controller and the synchronous controller's clock starts, concurrent to presetting of the state variable(s) of the synchronous controller. From time point, t0, to time point, t1, the process of phase and frequency synchronization and state variable presetting continues while the asynchronous controller maintains control of the power stage. At time point, t1, synchronization of the phase/frequency of the asynchronous controller with the synchronous controller's clock has been achieved. From time point, t1, to time point, t2, the control unit 308 waits a few clock cycles for phase and frequency lock to be confirmed and presetting of the state variable(s) of the synchronous controller continues while the asynchronous controller maintains control of the power stage. At time point, t2, phase and frequency lock is confirmed and the synchronous controller is granted control of the power stage under PWM.

Figure 5:
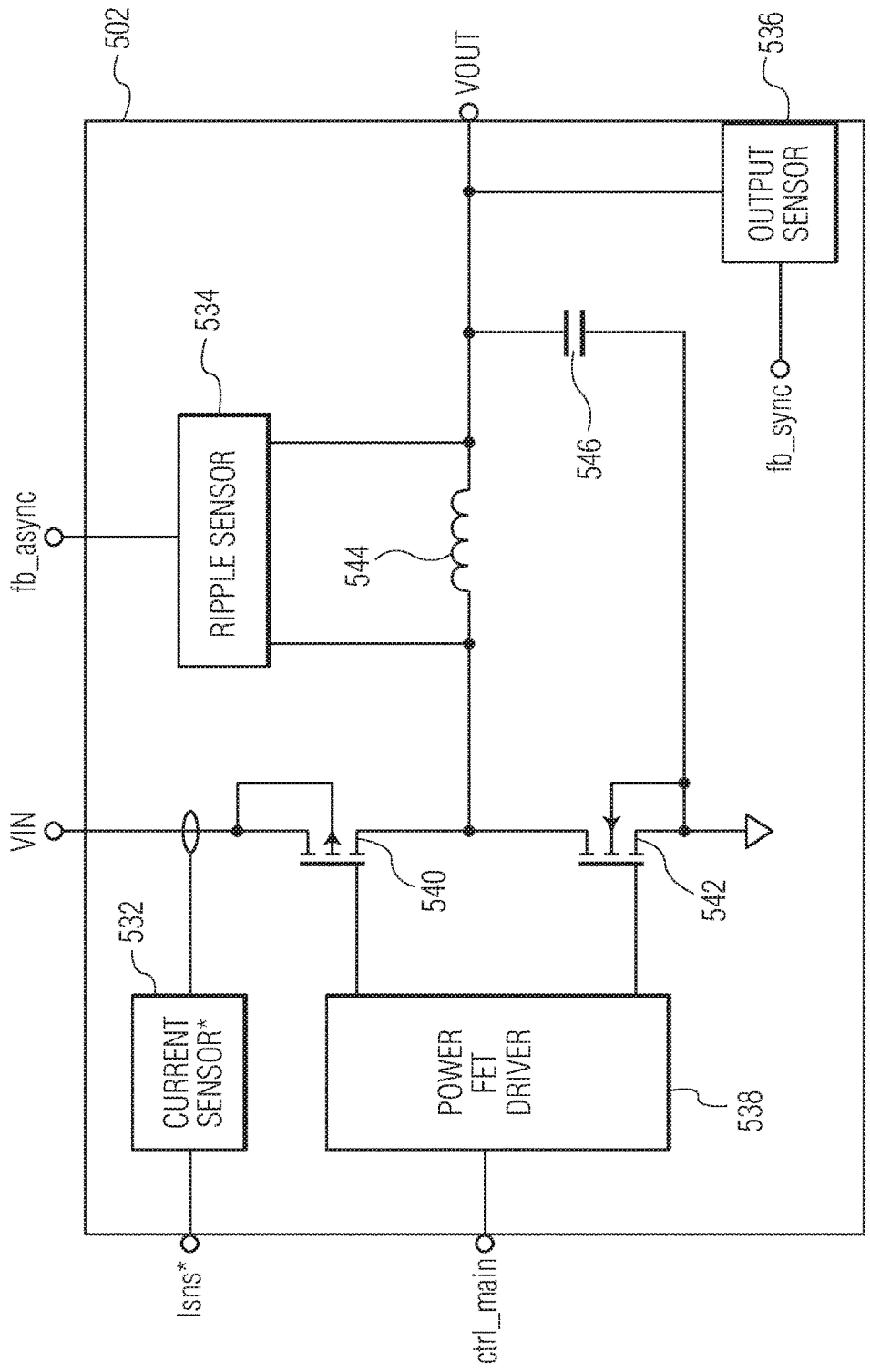
FIG. 5 depicts an embodiment of a power stage of the switched-mode power supply depicted in FIG. 3.

FIG. 5 depicts an embodiment of the power stage 302 of the switched-mode power supply 300 depicted in FIG. 3. In the embodiment of FIG. 5, a power stage 502 includes an optional current sensor 532, a ripple sensor 534, an output sensor 536, a power field-effect transistor (FET) driver 538, transistors 540, 542, an inductor 544, and a capacitor 546. The optional current sensor is configured to generate a control signal, "Isns*," for the synchronous controller 304 (shown in FIG. 3) in response to an input current, which in this example is equal to the current in the inductor 544 when the transistor 540 is conducting. The power FET driver is configured to drive the transistors 540, 542 under the control of a signal, "ctrl_main," from the multiplexer. The ripple sensor is configured to monitor the voltage and/or current ripple across the inductor and produce a proportional signal, "fb_async," for feedback to the asynchronous controller 306 (shown in FIG. 3). The output sensor is configured to monitor the output voltage, VOUT, of the power stage and produce a proportional signal, "fb_sync," for feedback to the synchronous controller. The power stage 502 depicted in FIG. 5 is a possible implementation of the power stage 302 depicted in FIG. 3. However, the power stage depicted in FIG. 3 can be implemented differently from the power stage depicted in FIG. 5.

Figure 6:
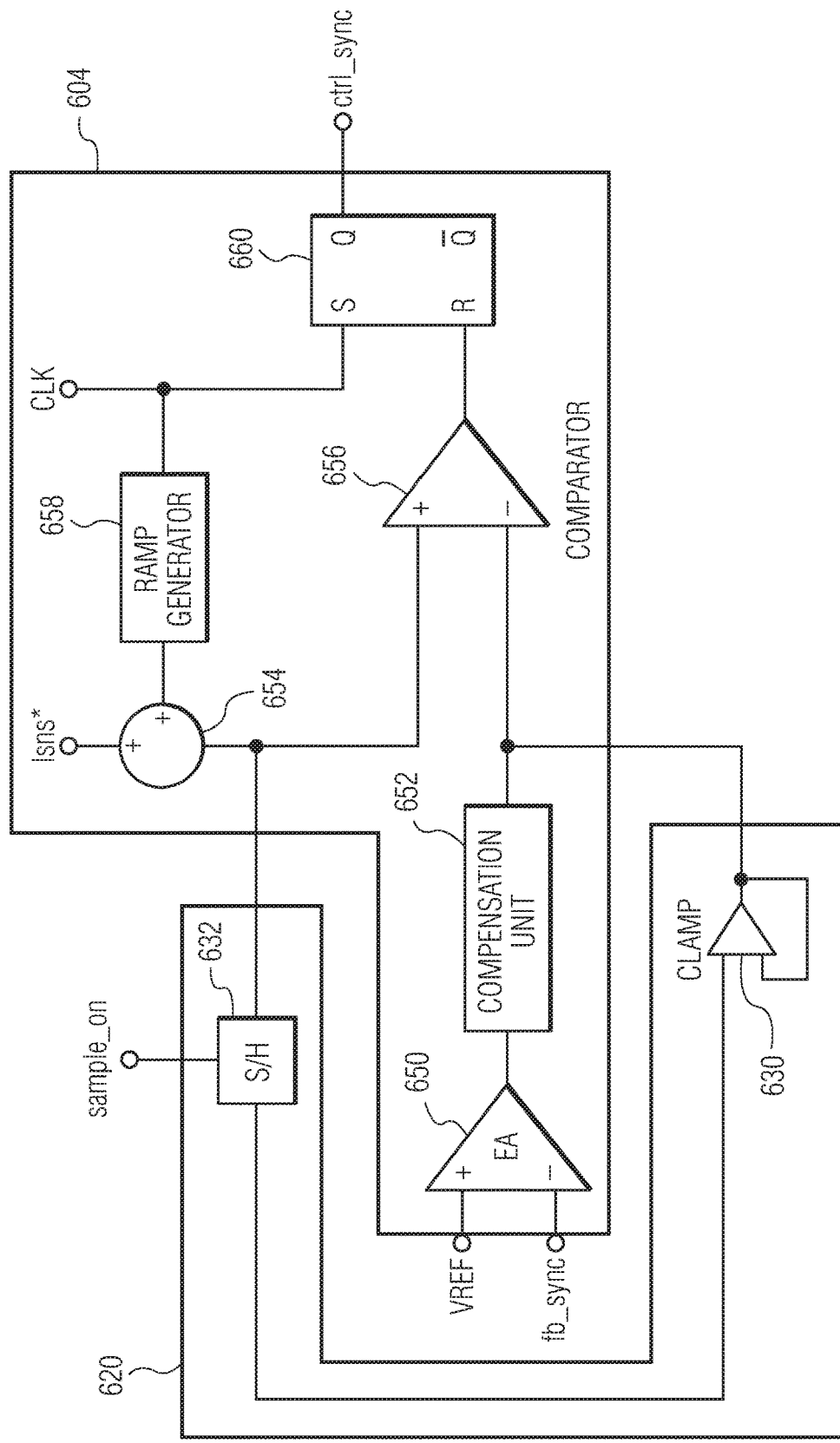
FIG. 6 depicts an embodiment of a synchronous controller of the switched-mode power supply depicted in FIG. 3.

FIG. 6 depicts an embodiment of the synchronous controller 304 of the switched-mode power supply 300 depicted in FIG. 3. In the embodiment of FIG. 6, a synchronous controller 604 is used with a sample and hold unit 620 that includes a clamp 630 and a sample and hold (S/H) controller 632. In the embodiment of FIG. 6, the synchronous controller includes an error amplifier 650, a compensation unit 652, an optional voltage or current summing element 654, a comparator 656, a ramp generator 658, and a latch 660. The error amplifier is configured to compare a reference voltage, "VREF," with the feedback signal, fb_sync, from the power stage 302 (shown in FIG. 3), and to amplify the difference between the reference voltage, VREF, and the feedback signal, fb_sync. In some embodiments, the sample and hold unit is further configured to set an output of the compensation unit in the synchronous controller to a preset status before control of the power stage is transitioned to the synchronous controller. The compensation unit is configured to perform signal compensation on the output of the error amplifier. The comparator is configured to compare the output of the voltage or current summing element to the output of the compensation unit when Isns is present or compare the output of the ramp generator to the output of the compensation unit when Isns is not present. The latch is connected to the clock signal, CLK, and to the output of the comparator. The latch is configured to output a control signal, ctrl_sync, based on the clock signal, CLK, and on the output of the comparator. The synchronous controller 604 depicted in FIG. 6 is a possible implementation of the synchronous controller 304 depicted in FIG. 3. However, the synchronous controller depicted in FIG. 3 can be implemented differently from the synchronous controller depicted in FIG. 6.

In an embodiment, the error amplifier 650 and the compensation unit 625 may have a relatively high/long time constant because of stability considerations, compared to the time constant of a typical amplifier. If the synchronous controller is given immediate control of the power stage, the output of the synchronous controller may exhibit large excursions as the error amplifier searches for the correct operating point over multiple clock cycles. By synchronizing the asynchronous controller 306 to the synchronous controller's clock and presetting the output of the compensation unit, excursions at the output, Vout, of the power stage can be reduced or eliminated when switching from asynchronous to synchronous control. Concurrently with synchronizing the phase and frequency configuration of the asynchronous controller with the clock signal of the synchronous controller, the output of the compensation unit in the synchronous controller is set to a preset operating point (e.g., by the clamp 630) before control of the power stage is transitioned to the synchronous controller. By synchronizing with the asynchronous controller, the synchronous controller can produce a partial set of state signals, which are then used to pre-bias the output of the compensation unit via the sample and hold unit 620 using the clamp 630. In some embodiments, the S/H controller 632 is configured to pre-bias the output of the compensation unit to a ramp signal that is generated by the ramp generator or to the sum of the ramp signal and the current sensed signal, "Isns*," at the end of the pulse width of a PWM signal. The ramp signal and/or the current sensed signal, Isns*, may be produced in synchronization with the switching in the power stage. The current sensed signal, Isns*, is present independently in a current-mode synchronous controller and is typically summed with or subtracted from the ramp signal in peak or valley current mode controllers. The ramp signal that is generated by the ramp generator or that is the sum of the ramp signal and the current sensed signal, Isns*, is connected to a first input of the comparator 656, whereas the output of the error amplifier after passing through the compensation unit is connected to a second input of the comparator. The output of the synchronous controller can be at the proper state when control of the power stage is transitioned to the synchronous controller.

Figure 7:
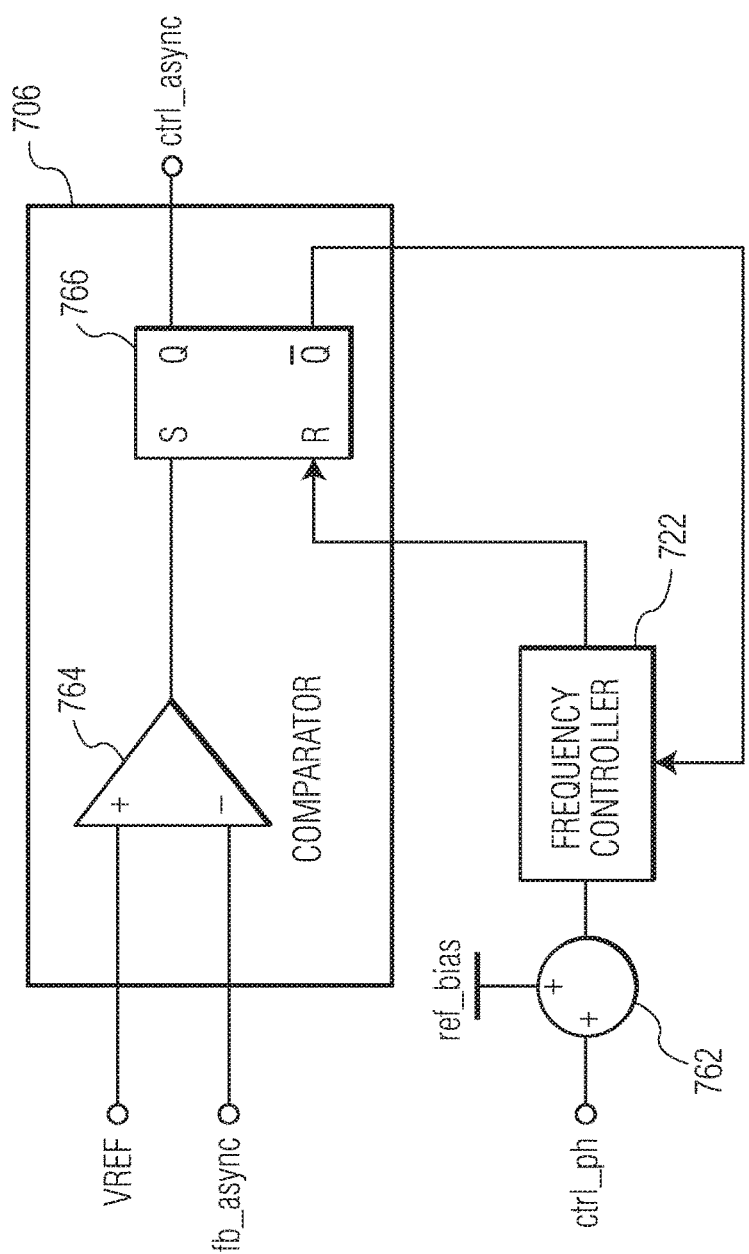
FIG. 7 depicts an embodiment of an asynchronous controller of the switched-mode power supply depicted in FIG. 3.

FIG. 7 depicts an embodiment of the asynchronous controller 306 of the switched-mode power supply 300 depicted in FIG. 3. In the embodiment of FIG. 7, an asynchronous controller 706 is used with a frequency controller 722 and a summing element 762. For example, the asynchronous controller includes a comparator 764 and a latch 766. The comparator is configured to compare the reference voltage, VREF, to the feedback signal, fb_async, from the power stage 302. The latch is connected to the comparator and to the frequency controller. The latch is configured to output a control signal, ctrl_async, based on a control signal from the frequency controller and the output of the comparator. The asynchronous controller 706 depicted in FIG. 7 is a possible implementation of the asynchronous controller 306 depicted in FIG. 3. However, the asynchronous controller depicted in FIG. 3 can be implemented differently from the asynchronous controller depicted in FIG. 7.

Figure 8:
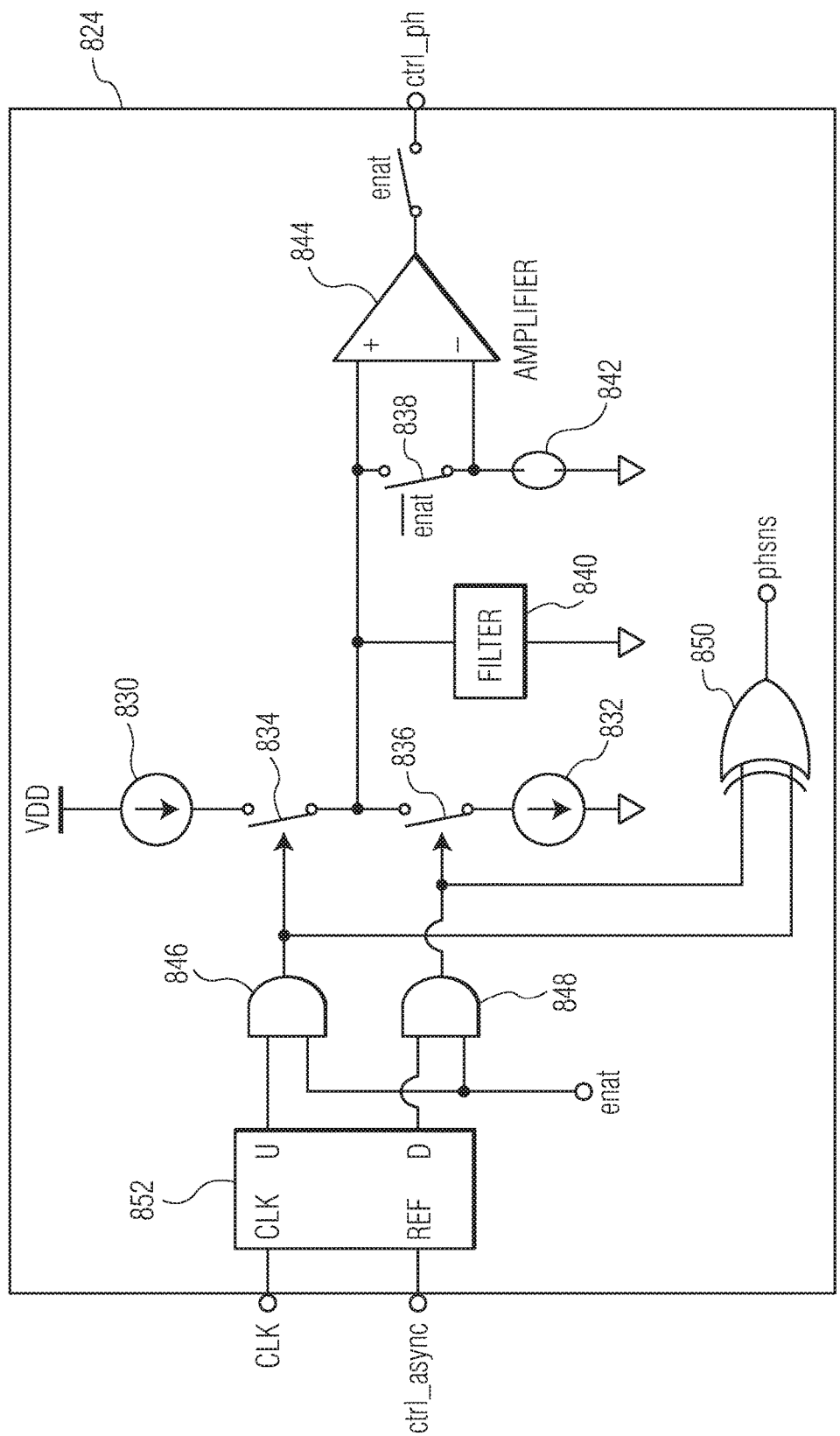
FIG. 8 depicts an embodiment of a phase lock controller of the switched-mode power supply depicted in FIG. 3.

FIG. 8 depicts an embodiment of the phase lock controller 324 of the switched-mode power supply 300 depicted in FIG. 3. The phase lock controller may be configured to synchronize a phase and frequency of the asynchronous controller 306 with the clock signal, CLK, that is used to drive the synchronous controller 304 in response to the enable signal, enat. In the embodiment of FIG. 8, a phase lock controller 824 includes current sources 830, 832, switches 834, 836, 838, a filter 840, a voltage source 842, an amplifier 844, AND gates 846, 848, an XNOR gate 850, and a latch 852. The phase lock controller 824 depicted in FIG. 8 is a possible implementation of the phase lock controller 324 depicted in FIG. 3. However, the phase lock controller depicted in FIG. 3 can be implemented differently from the phase lock controller depicted in FIG. 8.

Figure 9:
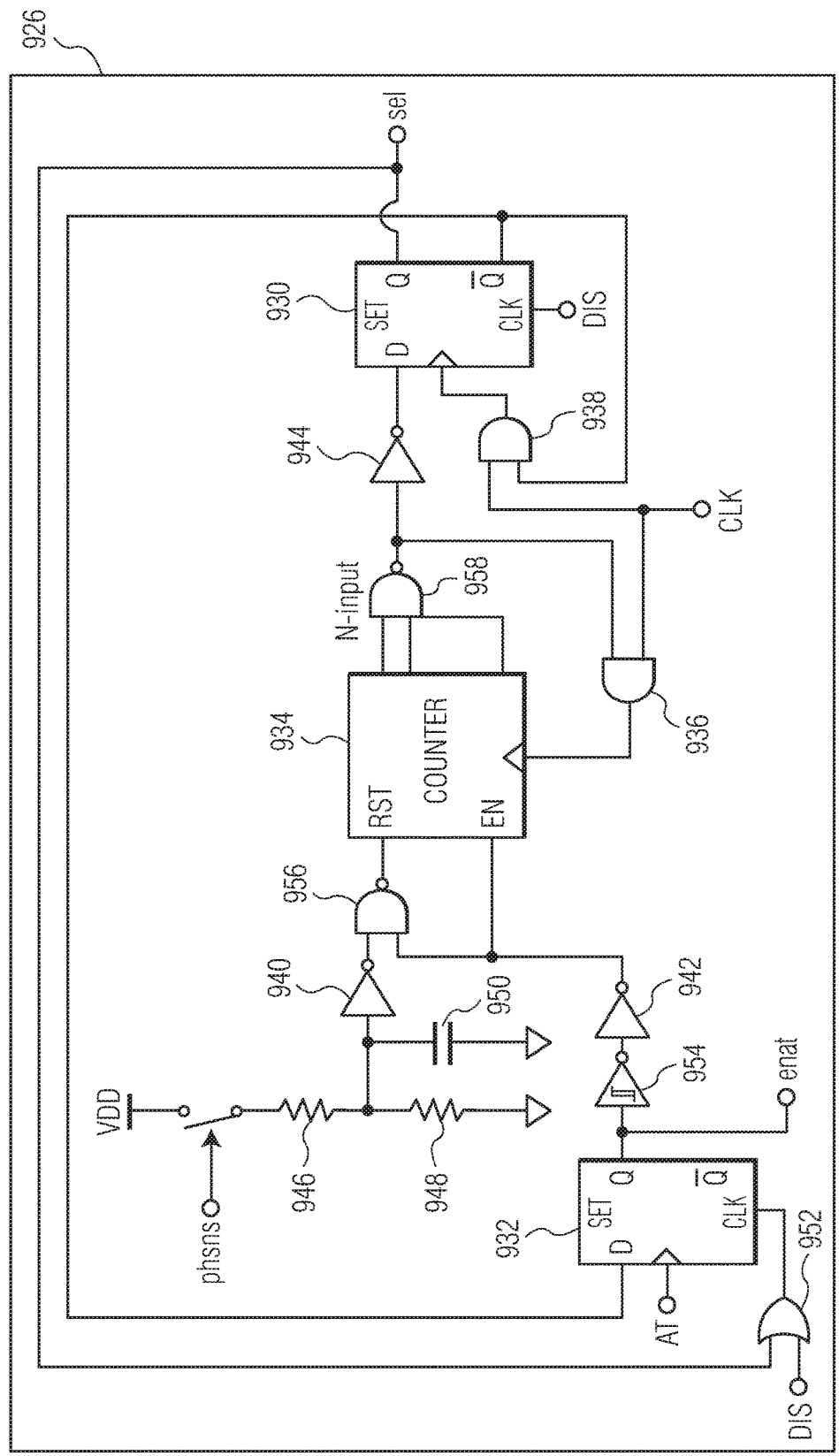
FIG. 9 depicts an embodiment of a control logic circuit of the switched-mode power supply depicted in FIG. 3.

FIG. 9 depicts an embodiment of the control logic circuit 326 of the switched-mode power supply 300 depicted in FIG. 3. The control logic circuit may be configured to make a determination that a phase and frequency of the asynchronous controller 306 are synchronized with the clock signal, CLK, that is used to drive the synchronous controller 304 and to control the sample and hold unit 320, the multiplexer 328, and the phase lock controller 324. In the embodiment of FIG. 9, a control logic circuit 926 includes latches 930, 932, a counter 934, AND gates 936, 938, invertors 940, 942, 944, resistors 946, 948, a capacitor 950, an OR gate 952, a delay element 954, and NAND gates 956, 958. The control logic circuit 926 depicted in FIG. 9 is a possible implementation of the control logic circuit 326 depicted in FIG. 3. However, the control logic circuit depicted in FIG. 3 can be implemented differently from the control logic circuit depicted in FIG. 9.

Figure 10:
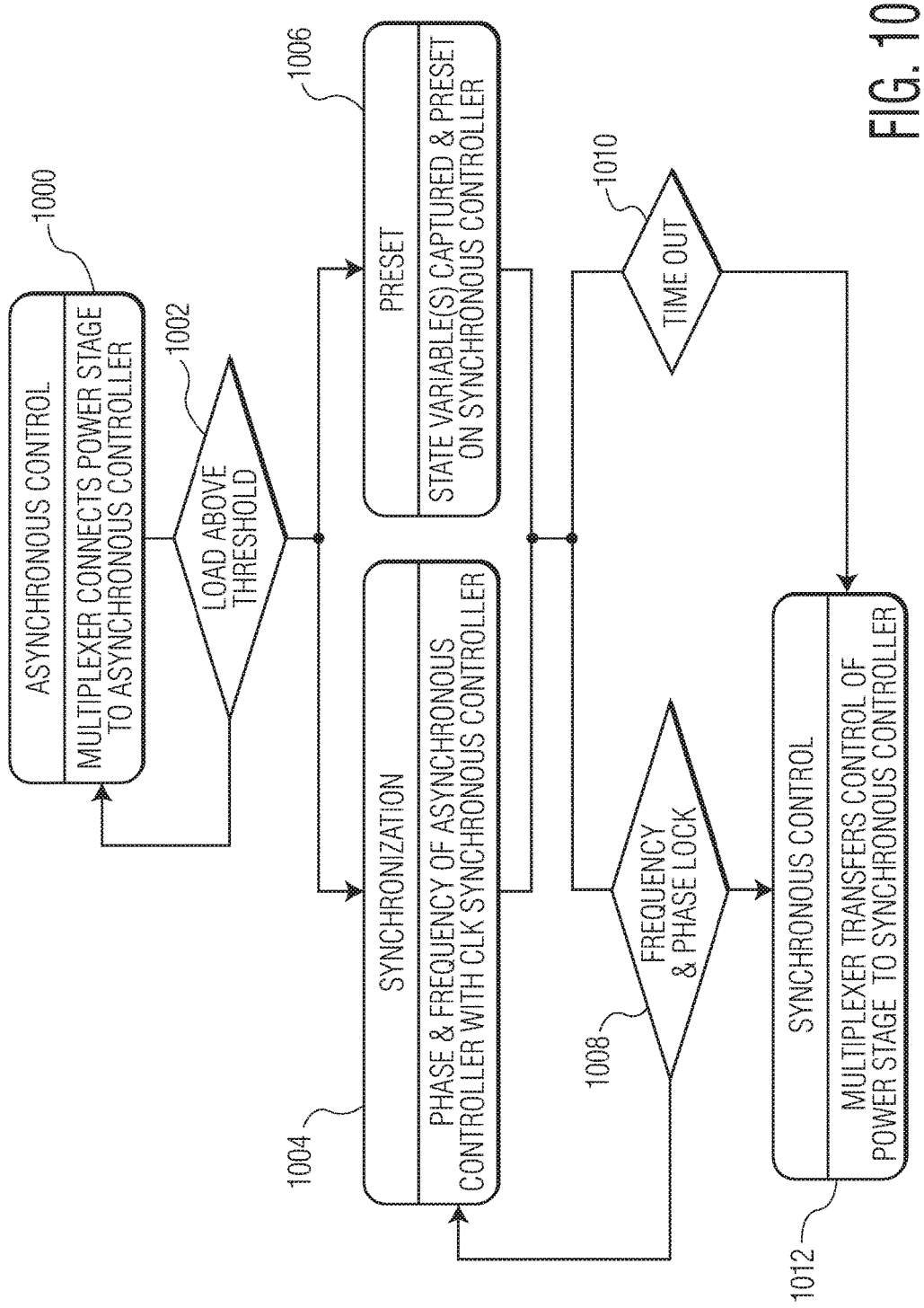
FIG. 10 is a process flow diagram of the switched-mode power supply depicted in FIG. 3.

FIG. 10 depicts a process flow diagram of the switched-mode power supply 300 depicted in FIG. 3. Specifically, in block 1000, the power stage is under asynchronous control and the multiplexer 328 connects the power stage to the asynchronous controller 306. In block 1002, it is determined that a load for the switched-mode power supply is above a predefined threshold. In block 1004, a phase and frequency of the asynchronous controller is synchronized with the clock, CLK, for driving the synchronous controller 304, while in block 1006, one or more state variables are captured and preset in the synchronous controller. In block 1008, it is determined that frequency and phase lock is achieved. In block 1010, it is determined that a time out of predefined number of clock cycles is carried out after which transfer of the control of the power stage from the asynchronous controller to the synchronous controller is forced. In block 1012, the multiplexer connects the power stage to the synchronous controller and the power stage is under synchronous control.

Figure 11:
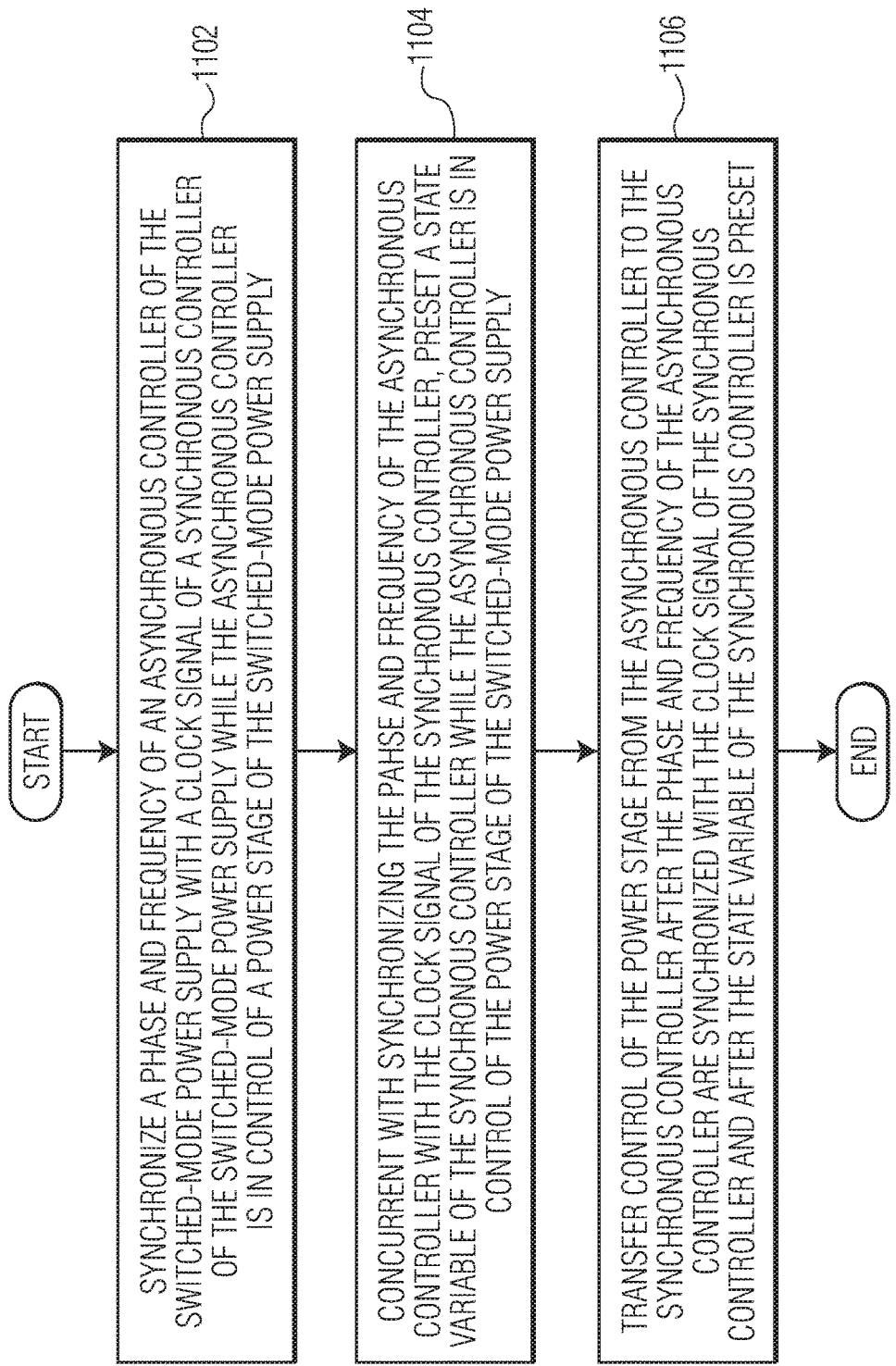
FIG. 11 is a process flow diagram of a method for operating a switched-mode power supply in accordance with an embodiment of the invention.

FIG. 11 is a process flow diagram of a method for operating a switched-mode power supply in accordance with an embodiment of the invention. At block 1102 a phase and frequency of an asynchronous controller of the switched-mode power supply are synchronized with a clock signal of a synchronous controller of the switched-mode power supply while the asynchronous controller is in control of a power stage of the switched-mode power supply. At block 1104, concurrent with synchronizing the phase and frequency of the asynchronous controller with the clock signal of the synchronous controller, a state variable of the synchronous controller is preset while the asynchronous controller is in control of the power stage of the switched-mode power supply. At block 1106, control of the power stage is transferred from the asynchronous controller to the synchronous controller after the phase and frequency of the asynchronous controller are synchronized with the clock signal of the synchronous controller and after the state variable of the synchronous controller is preset. The switched-mode power supply may be the same as or similar to the switched-mode power supply 100 depicted in FIG. 1 and/or the switched-mode power supply 300 depicted in FIG. 3. The power stage may be the same as or similar to the power stage 102 depicted in FIG. 1, the power stage 302 depicted in FIG. 3, and/or the power stage 502 depicted in FIG. 5. The asynchronous controller may be the same as or similar to the asynchronous controller 106 depicted in FIG. 1, the asynchronous controller 306 depicted in FIG. 3, and/or the asynchronous controller 706 depicted in FIG. 7. The synchronous controller may be the same as or similar to the synchronous controller 104 depicted in FIG. 1, the synchronous controller 304 depicted in FIG. 3, and/or the synchronous controller 604 depicted in FIG. 6.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for operating a switched-mode power supply, the method comprising:
    synchronizing a phase and frequency of an asynchronous controller of the switched-mode power supply with a clock signal of a synchronous controller of the switched-mode power supply while the asynchronous controller is in control of a power stage of the switched-mode power supply;
    presetting a state variable of the synchronous controller while the asynchronous controller is in control of the power stage of the switched-mode power supply, wherein presetting the state variable of the synchronous controller comprises setting an output of a compensation unit in the synchronous controller to a preset status; and
    transferring control of the power stage from the asynchronous controller to the synchronous controller after the phase and frequency of the asynchronous controller are synchronized with the clock signal of the synchronous controller and after the state variable of the synchronous controller is preset.

2. The method of claim 1, wherein synchronizing the phase and frequency of the asynchronous controller of the switched-mode power supply with the clock signal of the synchronous controller of the switched-mode power supply comprises synchronizing the phase and frequency of the asynchronous controller of the switched-mode power supply with a phase and frequency of the clock signal of the synchronous controller while the asynchronous controller is in control of the power stage of the switched-mode power supply.

3. The method of claim 1, further comprising controlling a multiplexer to connect an output of the asynchronous controller to the power stage.

4. The method of claim 1, wherein presetting the state variable of the synchronous controller comprises presetting the state variable of the synchronous controller in response to an external signal.

5. The method of claim 1, wherein transferring control of the power stage from the asynchronous controller to the synchronous controller comprises controlling a multiplexer to connect an output of the synchronous controller to the power stage.

6. The method of claim 1, wherein presetting the state variable of the synchronous controller comprises presetting the state variable of the synchronous controller in response to a change in a load of the switched-mode power supply or a change in an input voltage provided to the switched-mode power supply.

7. A controller device for operating a switched-mode power supply, the controller device comprising:
   an asynchronous controller;
   a synchronous controller; and
   a control unit configured to:
      synchronize a phase and frequency of the asynchronous controller of the switched-mode power supply with a clock signal of the synchronous controller of the switched-mode power supply while the asynchronous controller is in control of a power stage of the switched-mode power supply;
      preset a state variable of the synchronous controller while the asynchronous controller is in control of the power stage of the switched-mode power supply; and
      transfer control of the power stage from the asynchronous controller to the synchronous controller after the phase and frequency of the asynchronous controller are synchronized with the clock signal of the synchronous controller and after the state variable of the synchronous controller is preset, wherein the control unit comprises a phase lock controller configured to synchronize the phase and frequency of the asynchronous controller of the switched-mode power supply with the clock signal of the synchronous controller in response to a change in a load of the switched-mode power supply, a change in an input voltage provided to the switched-mode power supply, or an external signal while the asynchronous controller is in control of the power stage of the switched-mode power supply.

8. The controller device of claim 7, wherein the synchronous controller is configured to control the power stage based on the clock signal, and wherein the asynchronous controller is configured to control the power stage without being synchronized to a clock signal.

9. The controller device of claim 8, wherein the control unit is further configured to preset the state variable of the synchronous controller in response to the change in a load of the switched-mode power supply or the change in an input voltage into the switched-mode power supply while the asynchronous controller is in control of the power stage of the switched-mode power supply.

10. The controller device of claim 8, wherein the control unit comprises a sample and hold unit configured to set an output of a compensation unit in the synchronous controller to a preset status.

11. The controller device of claim 10, wherein the control unit further comprises a control logic circuit configured to make a determination that the phase and frequency of the asynchronous controller are synchronized with the clock signal of the synchronous controller.

12. The controller device of claim 8, wherein the control unit comprises a multiplexer configured to connect an output of the synchronous controller to the power stage after the phase and frequency of the asynchronous controller are synchronized with the clock signal of the synchronous controller and after the state variable of the synchronous controller is preset.

13. The controller device of claim 8, wherein the control unit comprises a frequency controller configured to synchronize the phase and frequency of the asynchronous controller of the switched-mode power supply with a phase and frequency of the clock signal of the synchronous controller while the asynchronous controller is in control of the power stage of the switched-mode power supply.

14. A switched-mode power supply, the switched-mode power supply comprising:
   a power stage;
   an asynchronous controller configured to control the power stage without being synchronized to a clock signal;
   a synchronous controller configured to control the power stage based on a clock signal; and
   a control unit configured to:
      synchronize a phase and frequency of the asynchronous controller of the switched-mode power supply with a clock signal of the synchronous controller of the switched-mode power supply while the asynchronous controller is in control of a power stage of the switched-mode power supply;
      preset a state variable of the synchronous controller while the asynchronous controller is in control of the power stage of the switched-mode power supply; and
      transfer control of the power stage from the asynchronous controller to the synchronous controller after the phase and frequency of the asynchronous controller are synchronized with the clock signal of the synchronous controller and after the state variable of the synchronous controller is preset, wherein the control unit comprises a sample and hold unit configured to set an output of a compensation unit in the synchronous controller to a preset status before control of the power stage is switched to the synchronous controller.

15. The switched-mode power supply of claim 14, wherein the control unit further comprises a control logic circuit configured to make a determination that the phase and frequency of the asynchronous controller are synchronized with the clock signal of the synchronous controller.

16. The switched-mode power supply of claim 14, wherein the control unit comprises a phase lock controller configured to synchronize the phase and frequency of the asynchronous controller of the switched-mode power supply with the clock signal of the synchronous controller in response to a change in a load of the switched-mode power supply, a change in an input voltage provided to the switched-mode power supply, or an external signal while the asynchronous controller is in control of the power stage of the switched-mode power supply.

17. The switched-mode power supply of claim 14, wherein the control unit further comprises a multiplexer configured to connect an output of the synchronous controller to the power stage after the phase and frequency of the asynchronous controller are synchronized with the clock signal of the synchronous controller and after the state variable of the synchronous controller is preset.

* * * * *